Sept. 4, 1956  A. D. HERMAN  2,761,707
TUBE COUPLING WITH IMPRESSIONABLE METALLIC SEAL
Filed Dec. 16, 1954  3 Sheets-Sheet 1
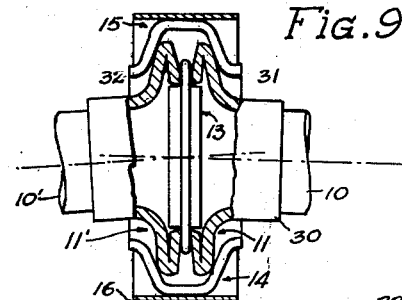
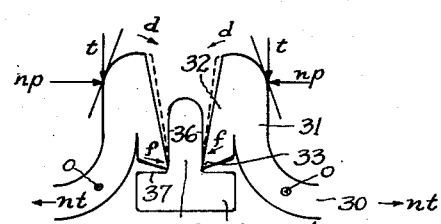
Fig.9
Fig.5
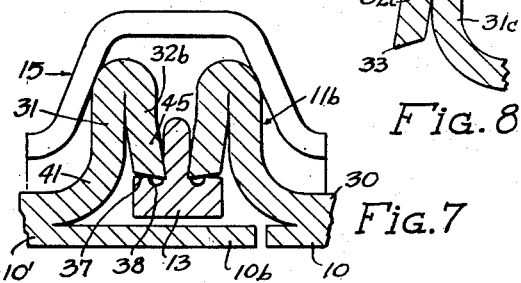
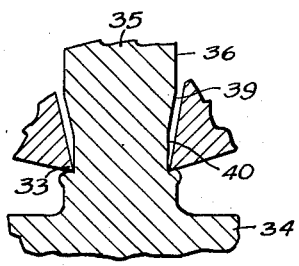
Fig.8
Fig.7
Fig.4
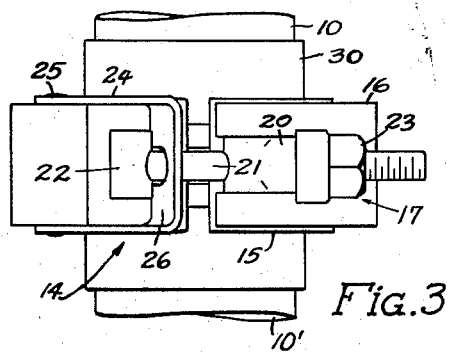
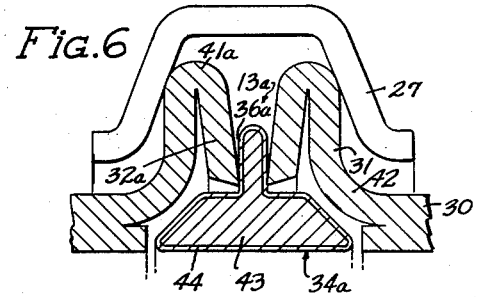
Fig.6
Fig.3
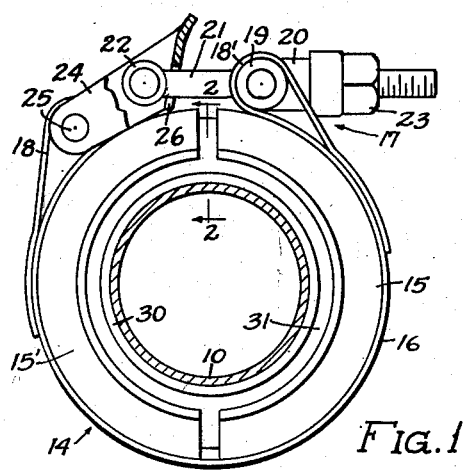
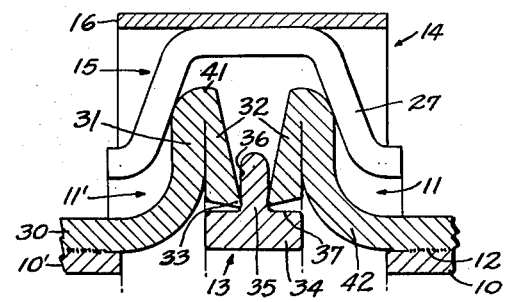
Fig.2
Fig.1
INVENTOR.
ALBERT D. HERMAN
BY Lynn H. Latta
–ATTORNEY–

Sept. 4, 1956  A. D. HERMAN  2,761,707
TUBE COUPLING WITH IMPRESSIONABLE METALLIC SEAL
Filed Dec. 16, 1954  3 Sheets-Sheet 3

INVENTOR.
ALBERT D. HERMAN
BY Lynn H Latta
-ATTORNEY-

United States Patent Office 2,761,707
Patented Sept. 4, 1956

2,761,707

TUBE COUPLING WITH IMPRESSIONABLE METALLIC SEAL

Albert Dale Herman, Encino, Calif., assignor, by mesne assignments, to Aeroquip Corporation, Jackson, Mich., a corporation of Michigan Application December 16, 1954, Serial No. 475,775

28 Claims. (Cl. 285—367)

This invention relates to tube couplings, its general object being to provide a coupling that is suitable for use in a high temperature fluid line carrying fluid, either gaseous or liquid, under pressure.

This application is in part a continuation of prior U. S. patent applications S. N. 337,072, filed February 16, 1953, for Tube Seal, and S. N. 358,747, filed June 1, 1953, for Tube Coupling Seal.

A primary object of this invention is to provide a coupling that is adapted to maintain a fluidtight joint in a pressure fluid line while withstanding temperatures of 500° F. to 1000° F. and above without failing or deteriorating. To this end, the invention contemplates an all-metal coupling including a seal ring or gasket of metal as contrasted to a gasket of soft material such as rubber or equivalent composition material. Specifically, the invention contemplates a coupling which utilizes metal-to-metal sealing contact between coacting coupling elements comprising a metal seal ring interposed between and sealed against symmetrical tube flange units which are identical so that tooling and production costs are minimized.

Another object is to provide a coupling embodying an all metal seal that will accommodate repeated expansions and contractions arising from wide temperature fluctuations in the fluid line and the resultant changes in loading on the coupling, without becoming loosened or losing any of its fluid sealing effectiveness. It is also intended that the coupling shall accommodate, without loss of sealing efficiency, variable end loading set up in the installation of a fluid line, thereby avoiding the necessity for extreme accuracy in determining the end spacing between the tubing flange units when the tube sections are being anchored in place in the fluid line.

A persistent difficulty that has beset all prior attempts to seal a pressure fluid line coupling using a metal to metal seal, has been the gradual relaxing of the sealing contact as one element of a pair of mating coupling elements becomes gradually indented more and more deeply by the pressure contact of its mating coupling element, as the elements work against one another through the action of vibration, expansion and contraction, or any other fluctuation in the end loading of the joint. To effect a solution of this problem, this invention aims to provide a "live" joint wherein a pair of opposed, symmetrical flange units, having, intermediate their respective outer and inner radii, integral concentric annular sealing edges which bear against substantially radial faces of a seal ring, under pressure which is developed by drawing the peripheries of the flange units toward one another and is transmitted yieldingly through the flange units, the latter being drawn toward one another so as to be placed under substantial deflection, which deflection may increase or decrease in response to expansion or contraction in the fluid line or in response to gradual indenting of the sealing elements under their continued pressure contact, without any substantial diminution in the pressure of such contact or in the pressure fluid sealing efficiency of the joint.

More specifically, the invention contemplates flange units having terminal flange parts of slightly frusto-conical form (so as to possess the Belleville washer characteristics of maintaining substantially constant loading during a range of flattening deflection) and provided at their inner margins (constituting their end extremities) with the above mentioned annular sealing edges.

A further object is to provide a fluid line coupling embodying a metal seal ring which, in addition to its function as a gasket, operates as a device for indexing the symmetrical flange units of the coupling in substantial alignment along the tube axis.

Another object is to provide an all-metal coupling that is adapted for flexing to accommodate variable conditions of alignment and misalignment of the tubing sections without loss of fluid sealing efficiency. In this respect, the invention contemplates a flexible coupling as contrasted to a gland type tubing joint having no flexibility. I find that in the coupling with its symmetrical flange units bearing under deflection against the opposite sides of the seal ring, this result is satisfactorily attained through the capacity of the flange units to undergo varying degrees of deflection at different points around their circumferences. For example, should the tube sections of a fluid line embodying this improved coupling shift from positions of axial alignment to relative positions wherein their axes define an angle of less than 180° at the center of the joint, such angular misalignment will be accommodated, without loss of sealing efficiency, by an increased deflection of the flange units on the side of the joint which lies within this angle of less than 180°, accompanied by a decrease in deflection in the flange units at diametrically opposed points, and yet the pressure loading against the seal ring will remain uniformly distributed around the circumference thereof and there will be uniform efficiency of sealing throughout this circumference. In this connection, the invention contemplates the use of a coupling device for bridging between and applying forces to the flange units, of a character such as to accommodate any such angular misalignment of the flange units, while maintaining end pressure against them.

The operation of the coupling of my invention is particularly characterized by a "breathing" action wherein the tube flanges, in response to changes in end loading or in angular misalignment of the tube section axes, will undergo a small amount of radial shift against the faces of the seal ring, with an indenting action which conforms the circumferential contours of the flanges and seal ring to one another with a mating contact such as to maintain a good fluid seal, even under high temperature and high pressure conditions, throughout the small range of radial shift, whereby the contractions and expansions and misalignments of the tube sections may occur without loss of fluid sealing effectiveness.

Others have previously proposed to utilize a Belleville washer, having inner and outer margins both sealing, through radial contraction of the inner margin and expansion of the outer margin in the flattening of the washer, into sealing contact with radially spaced cylindrical seats in cooperating coupling elements at the inner and outer margins of the washer respectively. Such proposals have not proven satisfactory. One objection to such an arrangement is the multiplication of the areas of pressure sealing contact between such washer and the cylindrical seats. This problem becomes especially difficult because of the necessity for evenly distributing the radial clearances between the outer and inner margins of the washer and the respective radially spaced seats. Such an arrangement has the further objection that it cannot provide an adequate range of deflection to accommodate axial expansion and contraction and axial misalignment without substantial change in the pressure loading of the mating edges and seats. It is especially difficult, and so far as I have been able to determine, utterly impossible to maintain adequate range of deflection at both the inner and outer margins of such a washer seal, coupled with adequate pressure sealing contact at both said outer and inner areas of contact.

A further object of the invention is to provide an all metal coupling which avoids the difficulties just mentioned. I have found where the opposed symmetrical flange units are integral with the ends of the tube sections or with collars which are welded to the ends of tube sections, and are each of a doubled form, each including a pair of flange parts, namely a terminal flange part which has at its inner margin the sealing edge for contact with a seal ring, together with an intermediate flange part which is joined to the margin of the terminal flange part by an integral web or return bend by which the pair of flange parts are closely coupled so as to be in substantially immediate face to face opposition in a substantially flat radial plane, with the end faces of the respective terminal flanges, on opposite sides of the seal ring, being in slightly converging relation toward the coupling axis, that the objects of the invention, stated above, are successfully attained, and accordingly a further object is to provide a coupling having these characteristics.

Another problem is encountered frequently in an all metal coupling when the occasion arises for uncoupling the tube sections and then re-establishing the coupling. Where one of the coupling elements is relatively hard and the other is relatively soft, there will be established in the softer sealing surface an annular depression where the harder element has been impressed therein. This depression remains in the softer surface and increases the difficulty of establishing a subsequent seal between the coupling elements, due to the virtual impossibility of re-establishing the original identical registration between the coupling elements. The present invention aims to provide a tube coupling having sealing means which, although it does not utilize a soft yielding gasket, nevertheless will accommodate frequent uncoupling and re-coupling operations without seriously impairing the capacity of the coupling to establish a pressure tight seal.

Other objects will become apparent in the ensuing specifications and appended drawings in which:

Fig. 1 is a cross sectional view of a line of tubing showing, in end elevation, a coupling embodying the invention;

Fig. 2 is a fragmentary axial sectional view thereof taken on the line 2—2 of Fig. 1;

Fig. 3 is a plan view of the coupling;

Fig. 4 is an enlarged fragmentary axial sectional view of the mating coupling elements illustrating the seal that is established;

Fig. 5 is a schematic view illustrating the application of forces to the flange units of the coupling and the deflection thereby produced;

Figs. 6 and 7 are sectional views of modified forms of the coupling;

Fig. 8 is a view of modified form of the flange unit;

Fig. 9 is a sectional view illustrating the misalignment function of the coupling;

Figure 10:
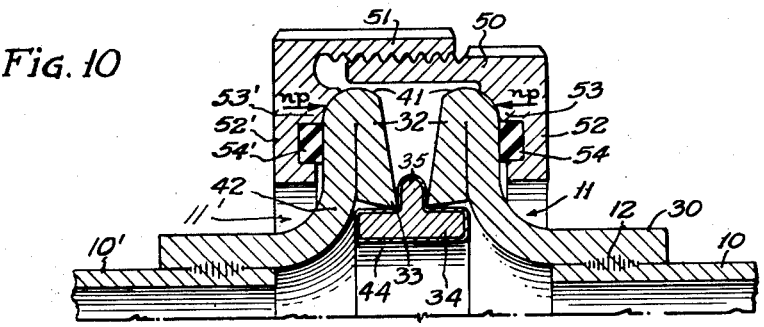
Fig. 10 is a fragmentary axial sectional view of another modified form of the invention.

*General description of tube coupling in which the invention may be embodied in preferred form*

Referring now to the drawings in detail, I have shown in Figs. 1, 2, 3 and 4, a typical coupling, embodying the preferred form of the invention, which may be utilized for coupling a pair of tube sections 10, 10'; said coupling comprising generally a pair of flange units, indicated generally at 11, 11', adapted to be secured to the tube sections 10, 10' as by welding at 12; a seal ring, indicated generally at 13, interposed between and engaged by the flange units 11, 11'; and a coupling assembly, indicated generally at 14, encircling and embracing the flange units, 11, 11' and adapted, when constricted, to apply axial pressures to the flange units 11, 11' for moving them toward one another.

As shown, the coupling unit 14 is of the V-restrainer, band clamp type, embodying a pair of semi-circular restrainer segments 15, 15', a constrictor band 16 to which the segments 15, 15' are attached, as by spot welding, and take-up connector mechanism which is indicated generally at 17 in Fig. 1. The connector mechanism 17, the details of which form no part of the present invention, may be of a well known type including loops 18, 18' formed on the respective ends of band 16; a T-fitting having a cross-head 19 journalled in loop 18' and having a tubular shank 20; a T-bolt having a shank 21 slidably extended through tubular shank 20, having a cross-head 22, and having a threaded end and a nut 23 threaded thereon and engaging tubular shank 20; together with a quick-coupler latch element 24 including a pivot pin 25 pivotally mounted in loop 18 and a pair of spaced jaws 26 engaging the head 22 and defining between them a slot through which T-bolt shank 21 projects.

Restrainer segments 15 are of V-channel section and include radially inwardly diverging frusto-conical side wall portions 27 functioning as jaws for wedging action against flange units 11, 11', converting radial constricting pressure received from constrictor band 16 into axial pressure against the flanges.

*The invention as disclosed in Fig. 2—preferred form*

Each of the flange units 11, 11' includes a cuff portion 30 constituting one end portion of a section of tubing from which the flange unit is formed by a rolling operation. Projecting radially outwardly from cuff portion 30 and integrally joined thereto by a return bend 42, is an intermediate flange 31. Projecting radially inwardly from the periphery of intermediate flange 31 is a terminal flange 32. Flanges 31, 32 may be formed by rolling and expanding the tube blank in the area which ultimately becomes an integral web or return bend 41 joining the two flanges, the end portion of the blank being formed inwardly and finally ironed flatly against the flange 31 to become the terminal flange 32. After the completion of the rolling operation, the terminal flange 32 is beveled, as by machining, to provide a frusto-conical face which converges radially inwardly with reference to the seal ring 13, and intersects the inner margin of the flange 32 to define an annular sealing edge 33 of knife-edge form.

Fig. 8 shows a flange unit 13c such as may be formed by a machining operation as contrasted to a rolling operation, wherein the terminal flange 32c is joined to intermediate flange 31c by a return bend or web portion 41c which may be of greater depth than the return bend 41 of Fig. 2 or the return bend 41a of Fig. 6. Where the flange units are formed of a metal (such as titanium) that is not adapted to being expanded and ironed back upon itself from tubular stock, the invention contemplates machining the flange units from solid bar stock, in which case a cross section somewhat as shown in Fig. 8, would be formed with the flange parts slightly spaced (although in close face-to-face opposition) instead of the section shown in Fig. 3 where the terminal flange is in actual face-to-face contact with the intermediate flange.

Flange units 13 are preferably fabricated from tubing metal of moderate elasticity such as ordinary cold rolled steel or stainless steel, not approaching the degree of hardness characteristic of what is commonly referred to as "spring steel," yet possessing sufficient "spring back" to avoid permanent deformation of the flanges when coupled under pressure and later uncoupled.

The seal ring 13 comprises a tubular body portion 34 and a flat radial flange 35 projecting outwardly from the center thereof. Flange 35 has substantially flat radial side faces 36 functioning as seats against which the sealing edges 33 of terminal flanges 32 are adapted to make sealing engagement.

In the preferred form of the invention, seal ring 13 is of a relatively soft metal, such as copper or aluminum, and the sealing edges 33 of terminal flanges 32 are of harder metal adapted to indent the seats 36 when subjected to axial pressure. The respective end portions of tubular body 34 project axially from the side faces 36 of flange 35 to define, as their peripheral surfaces, annular shoulders 37. Sealing edges 33 of the flange units are adapted to seat in the side faces 36 of flange 35 without interference with the peripheral shoulders 37 of body 34. I find that this provides an improved sealing action in a coupling wherein generous tolerances in the concentricity and true circular shape of shoulders 37 and sealing edges 33, are allowed. Shoulders 37 are of a diameter sufficiently near to the diameter of the shoulders 37 so that the seal ring 13 will index the flange units 11, 11' in substantially coaxial registration while accommodating angular misalignment.

In the seal ring 13, the seats 36 are the external faces of the solid, uniform body of the seal ring. The conforming action of the edges 33 and seat 36 is such that the seal ring 13 may be simply and inexpensively coined without finish machining the seats 36.

The jaw segments 15, 15' when constricted radially inwardly, function to apply to the peripheries of intermediate flanges 31, axial pressure *np* (Fig. 5) which is effective to tilt the intermediate flanges 31 toward one another, the flanges 31 flexing at bends 42 (approximately at the points O in Fig. 5). In such tilting action, the peripheral portions of flanges 31 and 32 will be tilted toward one another as indicated by arrows *d* to positions substantially as indicated in dotted lines in Fig. 5 and the inner portions of flanges 32 will be contracted inwardly. At the same time, the sealing edges 33 will be forced axially into the seats 36.

In the functioning of the coupling to effect a high pressure seal, the sealing edges 33 of terminal flanges 32 are embedded under axial pressure in the softer material of seats 36, thus establishing a good seal, even in the presence of slight deviations from true flatness in seats 36 and in the planes in which edges 33 are disposed. In assembling a joint, as it is tightened, the edges 33 will initially establish pressure contact with seal ring faces 36 at a greater radius than that to which the edges 33 are contracted when the flanges 32 have been placed under full deflection in the fully tightened joint. At the radius of initial pressure contact, there will be an indenting effect from the pressure of the coned faces of flanges 32, at edges 33, roughly as indicated at 39 in Fig. 4. The flanges 32, at this point of initial contact, will have their normal, maximum cone angle disclosed in full lines in Fig. 5, and as the flanges reach their stage of complete deflection they will have flattened to the angle indicated in the dotted lines in Fig. 5.

In the contraction of the terminal flanges to this stage of complete deflection, and in subsequent expansions and contractions of the inner margins of flanges 32 in response to changes in loading conditions in the fluid line, the edges 33, with a scraping action, will indent the seats 36 over the radius of movement between the outer and inner limit positions thereof, to produce an annular indented area, designated 40 in Fig. 4, throughout which the seat 36 is accurately conformed to the edges 33 so that accurate fluid sealing will be maintained at all radii of this area during fluctuations in diameter of edges 33. The radial extent of conformed area 40 is of course shown in exaggerated degree in Fig. 4, for purpose of clarity of disclosure.

One of the essential characteristics of the invention is the application of pressure from segment 15 to annular areas confined to areas near the peripheries of intermediate flanges 31. The segment walls 27 being in flaring relation, diverging toward the axis of the joint, whereas the intermediate flanges 31 may be disposed in flat radial planes as shown in Fig. 2 (or only slightly flared in diverging relation toward the axis of the tube, at an angle much less than the angle of divergence of walls 27) leaves the areas of flanges 31 inwardly of their peripheries, as well as the peripheries themselves, free of any contact by the segments 15. Thus, it is possible for the intermediate flanges 31 to tilt toward one another as they are placed under deflection, without interference between the base regions of flanges 31 near bends 42 and the radially inner areas of walls 27. In this connection it may be pointed out that if the flanges 31 had the same angle of inclination as walls 27 so as to be fitted therein throughout the depth of the segments 15, it would be impossible to flex the flanges 31 toward one another to any appreciable extent, since the areas of pressure would immediately be transferred to the base regions of flanges 31 as soon as they commenced to tilt toward one another.

This provision of ample clearance for tilting the flanges 31 is also useful in accommodating angular misalignment of the tubing sections. Any such angular misalignment will tend to cause the flanges 31 to approach more closely at one point around the circumference and to spread farther apart at a diametrically opposite point. Where the flanges tend to approach more closely, they will tend to shift radially toward the crowns of segments 15 so as to seat more deeply therewithin. At the diametrically opposite points, the flanges will tend to draw out of the segments 15 as they spread farther apart. In all such movements, the inwardly diverging walls 27 of the segments 15, maintaining radial inward pressure against the flanges 31, will continue to maintain the flanges loaded under deflection which will be transmitted through the terminal flange parts 32 of Belleville washer form, in a manner to maintain constant loading on the sealing edges 33.

Axial loads in the fluid line tending to draw the tube sections apart (set up either by the anchoring of the tube sections in a fixed installation or by pressure in the line during its operation) will tend to draw the base bends 42 of the flanges away from one another and to tilt the flanges toward one another at their peripheries. Here again the flanges may fulcrum against the segment walls 27 at their peripheries and accommodate such tilting movement without materially changing the pressure loading of sealing edges 33, the terminal flanges 32 undergoing flattening deflection wherever required to accommodate such movements, while maintaining substantially constant loading.

Should the flange units tend to expand radially through high fluid pressure within the tubing line, such expansion will be readily accommodated by a slight outward shifting of the peripheries of flanges 31 within segment 15, with a resultant slight tilting of the flange units toward one another at their peripheries as they are thus wedged farther out in the segments 15.

In the event of contraction in the flange unit 11, or shifting of the tube sections toward one another, the flanges 31 will tend to peripherally spread apart and tilt away from one another, thus decreasing the deflection in the terminal flanges 32, but the latter will continue to maintain a substantially constant loading of sealing edges 33 against the seal ring.

The foregoing characteristics of operation, wherein the coupling accommodates all conceivable variations in existing conditions, from the effect of temperature change, variable mechanical loading of the tube sections, angular misalignment, vibration, etc. constitutes the coupling of my invention a "live" joint as contrasted to prior all metal couplings which have not embodied this wide range of adaptation to all conditions of change.

The differential between the hardness of the respective coupling elements may be varied within the scope of the invention, and a point may be reached where an indenting effect is noticeable in the edges 33, but in each instance the conforming of edges 33 and seats 36 one to the other over an annular area of appreciable radius, with efficient fluid sealing at various positions within such radius, will be effected. In this conforming of the sealing parts one to the other, the principle of eliminating the unsealing effect of inaccuracies in the parts as originally fabricated, whereby such original parts may not establish a complete fluid seal until sufficient pressure has been applied to bring about the conforming action, will in all cases be maintained.

*The modified form shown in Fig. 6*

Fig. 6 illustrates several modifications, any one of which may be embodied in the basic structure shown in Fig. 2 or in the forms shown in Figs. 7–9. The seal ring 13a, instead of being a solid ring of metal having a uniform texture throughout, may include a core body 43 of a harder metal (e. g. steel) having a coating 44 of a softer metal such as copper, which provides the seats 36a against which the flange edges 33 are adapted to seal. The seal ring 13a may also embody a modified central body section 34a which, instead of being of rectangular cross section, is of trapezoidal section and of sufficient dimensions to substantially fill the space defined between the bends 42 and within the inner margins of terminal flanges 32a.

Fig. 6 also illustrates how a terminal flange part 32a, instead of being rolled flatly against the intermediate flange 31 and then machined off so as to acquire its frusto-conical face, may be of uniform thickness and formed to the frusto-conical shape in the rolling operation by which the flange unit is developed. Full return bends 41a join flange parts 31 and 32a. The flange parts 31 and 32a are in substantially flat face to face opposition in a substantially radial plane, i. e., their inner faces are closely spaced and only slightly divergent, and are both closely associated with a substantially radial plane of the fluid line axis.

*The invention as disclosed in Fig. 7*

Fig. 7 illustrates a further modified form of the invention, wherein the seal ring 13b, although of T-section as in ring 13, is modified by having, in peripheral shoulders 37, grooves 38 which extend the seats 36 below the shoulders 37. This makes it possible for the inner margins of terminal flanges 32 to be contracted into substantial engagement with shoulders 37 while the sealing edges 33 remain seated against the perfectly flat areas of seats 36, avoiding jamming in the corners between seats 36 and shoulders 37. Actually, the edges 33 may be contracted to a diameter slightly within that of shoulders 37 so as to establish full piloting contact of shoulders 37 against the inner margins of terminal flanges 32, without disturbing the full seating of the edges 33 against seats 36. Also, the terminal flanges 32b of the flange unit 11b are shown as being formed with outer portions flatly folded against intermediate flanges 31 and inner portions 45 which have the slightly inwardly converging conical inclination of the terminal flanges shown in the other forms of the invention.

*Operation as illustrated in Fig. 9*

Fig. 9 illustrates, in exaggerated degree, the angular misalignment that can be accommodated by the coupling without impairment of sealing action. It may be noted that on the lower side of the view, where flange units are brought into closer than normal association as the result of the tilting of the tube sections 10, 10' toward one another to subtend an angle of less than 180° on that side of the coupling, the terminal flange parts 32 are flattened to a high degree while the intermediate flange parts 31 have retained substantially their normal right-angular relation to the respective tube axes (i. e.) are not substantially flexed. However, on the diametrically opposite side of the coupling (at the top of the view) the flange units, although spread apart to some extent as the result of the tilting of the tube sections away from one another to an angle of greater than 180° on that side, have not spread apart to the extent that such tilting would effect if the flange units were not restrained within the coupler 14. Instead, the intermediate flange parts 31 have been considerably flexed and tilted so as to subtend with respect to the respective tube axes, angles of greater obtuseness than the normal condition existing in the coupling as tightened with the tube sections in alignment. At the same time, the terminal flange parts 32 on that side of the coupling are relatively unflattened. The loading of the sealing edges 33 is nevertheless distributed substantially uniformly around the circumference of the seal.

In the diagram of forces shown in Fig. 5, the arrows $t$ indicate the radially constricting forces applied by V-segments 15, 15' to the peripheries of flange units 11, 11', developing the resultant axially compressive forces $np$ which flex the intermediate flange parts 31 about the bending area generally centered at O, and the letters $f$ indicate the application of pressure by sealing edges 33 to seats 36, these forces being directed primarily in an axial direction, but with some radial component derived from the contraction of edges 33 as the terminal parts 32 are flattened. End loads in tube sections 10, 10', tending to draw them apart and to tile flange units 11, 11' toward one another, are indicated by arrows $nt$, and fluid pressure in the fluid line, tending to wedge the flange units farther out in V-segments 15, 15', with a resultant tilting of the flange units toward one another, is indicated by arrows 35. Arrows $d$ indicate the tilting.

Fig. 10 illustrates how the invention may utilize a packing gland type of coupler embodying an externally threaded collar 50 and an internally threaded nut 51, these elements having radially inwardly extending end flanges 52 and 52' respectively, arranged to contact the flange units 11, 11' respectively at the rims thereof so as to apply the axially compressive forces $np$ to the rim extremities of the flanges. This may be accomplished by providing the flanges 52, 52' with axially projecting seats 53, 53' conforming to the curvature of the peripheral bends 41 of the respective flange units. To seal the coupler against the entry of dust, etc., annular gaskets 54, 54' may be interposed between flanges 52, 52' and flange units 11, 11', retained in suitable grooves in flanges 52, 52'.

Figure 11:
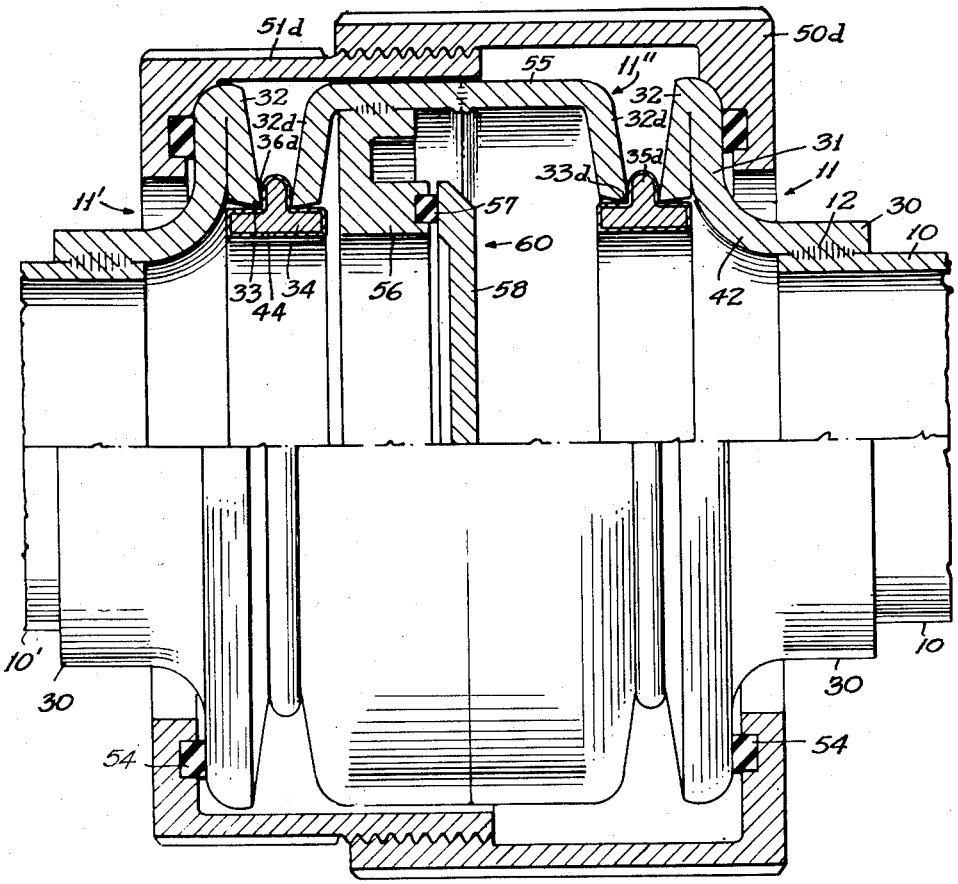
Fig. 11 is an axial sectional view of a further modified form of the invention.

Fig. 11 illustrates another modified form of the invention, wherein a pair of seal rings are interposed between flange units 11, 11' and a bridging flange unit 11" which may constitute a casing or mounting for any functional unit, such as valve 60, which it may be desired to mount between the tube sections being coupled. Flange unit 11" embodies a rim web portion 55 and a pair of inwardly extending, frusto-conical flanges 32d having sealing edges 33d opposed to the sealing edges 33 of flange units 11 and 11' respectively. Flanges 32d have a Belleville washer action corresponding to that of flange elements 32. Axially compressive forces $np$ are transmitted to flanges 32b through rim web member 55 and to flanges 32 by seats 53, 53' on the coacting threaded collar and nut elements 50d and 51d respectively.

Valve unit 60 may comprise a valve seat ring 56 carrying a valve seat 57 and a movable valve element 58 (e. g. a hinged flapper type valve element). These parts are shown by way of example.

Figure 12:
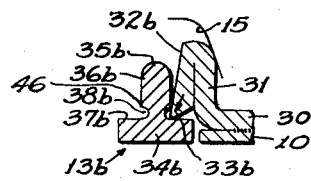
Fig. 12 is a fragmentary sectional view of another modified form of the invention.

The invention as disclosed in Fig. 12

Fig. 12 illustrates another arrangement for obtaining corner relief in the seal ring, such that the sealing edge 33b of a terminal flange 32b may be embedded under pressure in a single surface of seal ring 13b without interference with the adjoining surface in the corner space of the ring. In this case, the sealing edges 33b seat in the shoulders 37b of body 34b of the seal ring, and annular relief grooves 38b are extended axially into side faces 36b of radial flange 35b. The inner walls of grooves 38b constitute continuations of shoulders 37b axially inwardly past the respective planes of lateral faces 36b.

In the functioning of the coupling of Fig. 12, the beveled faces of terminal flanges 32b will fulcrum against shoulders 46 defined at the junctions of side faces 36b with the outer walls of annular grooves 38b, and, as the axial pressure is applied to the peripheries of intermediate flanges 31 by jaw segments 15, 15', with a resultant flexing and tilting action of the type described hereinabove in connection with Fig. 2, the flange edges 33b will be contracted radially inwardly to seat in shoulders 37b. The flexing and tilting action which occurs in the flange unit results from the fact that axial pressure is applied to the outer extremities of intermediate flanges 31, forcing them toward one another while the inner portions of flanges 32b are restrained against axially approaching one another by virtue of their fulcruming engagement with shoulders 46.

Figure 13:
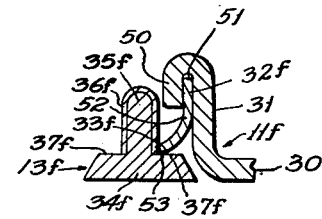
Fig. 13 is a fragmentary sectional view of another modified form of the invention.

The invention as disclosed in Fig. 13

Fig. 13 shows a further modification of the invention wherein each of the flange units 11f is of composite structure, including a rolled section having a collar portion 30, an intermediate flange 31 and an infolded marginal portion 50, and including, as a separate terminal flange part, a coned washer element 32f of relatively thin hardened sheet metal. Washer element 32f has a flat peripheral portion which is clamped tightly into an annular channel 51 defined between rolled margin 50 and intermediate flange 31; and has an axially flaring inner portion 52 the inner margin of which is beveled in such a manner as to provide an axially facing sealing edge 33f, to seat in lateral facing 36f, and an inner marginal extremity 53 constituting a shoulder for fulcruming against the shoulders 37f of seal ring 13. Although relatively thin as compared to the body section 30, 31, 50 of flange unit 11f, terminal flange part 32f is of sufficient thickness so that sealing edge 33f may be disposed an appreciable distance radially outwardly from fulcruming shoulder 53, so that edge 33f will seat in facing 36f sufficiently outwardly of the corner between facing 36f and shoulder 37f, to avoid interference from shoulder 37f.

As in all previously described forms of the invention, the inner diameter of terminal part 32f is somewhat larger than the outer diameter of shoulder 37f so that the end portions of body 34f may be freely inserted through the openings defined by inner marginal shoulders 53 of the terminal flange parts 32f; and so that, as the parts are compressed together, the inner marginal shoulders 53 will shrink in diameter so as to establish bearing engagement against shoulders 37f, thus providing for the accurate indexing of the tube sections in coaxial alignment. After firm seating of shoulders 53 against shoulders 37 has been established, further axial pressure will be transmitted almost entirely to facings 36f through edges 33f, the shoulders 53 sliding axially upon shoulders 37f. An improved action is obtained by leaving shoulders 37f uncoated and finished to avoid the development of any binding grip of shoulders 53 against shoulders 37f as the axial pressure is built up to a maximum. As the result, the axial pressure is utilized to the best advantage in seating the edges 33f in facings 36f. Further improvement in the results can be obtained by hardening the peripheral shoulders 37f and giving them a smooth finish. Alternatively, the entire core body of the seal ring may be of hardened metal, the soft metal of facings 36f providing adequately for the seating penetration of edges 33f therein.

Figure 14:
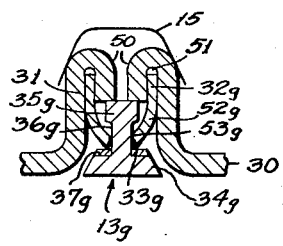
Fig. 14 is a fragmentary sectional view of another modification of the invention.
Figure 15:
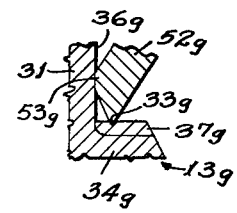
Fig. 15 is a fragmentary sectional view of a portion of Fig. 14, on enlarged scale.

The invention as disclosed in Figs. 14 and 15

Fig. 14 discloses an arrangement similar to that of Fig. 13, the primary difference being that the terminal washer elements 32g are formed with rounded shoulders 53g disposed as axial extremities thereof and with sealing edges 33g as the radially inner marginal edges thereof (shown in enlarged detail in Fig. 15). In this form of the invention, it is preferable to have the side faces 36g of flange 35g of seal ring 13g uncoated so as to facilitate smooth sliding bearing engagement of shoulders 53 thereagainst without binding or seizing. In such a case, the sealing seats 37g, of a metal softer than the body of ring 13g, are confined to the peripheral cylindrical shoulders of the respective end portions of annular body 34g of the seal ring 13g. The terminal washer parts 32g have their inner portions 52g in frusto-conical form and flared away from the intermediate flanges 31, as in the previously described form of the invention. In this arrangement, indexing is provided for by piloting the rim of central flange 35g (which may be thickened axially, as shown) within the inner margins of the infolded flange parts 50.

In each of the forms shown in Figs. 13 and 14, the terminal washer parts 32f, 32g are fluid-sealed between intermediate flanges 31 and folded marginal parts 50. In some cases, this may be best accomplished by tinning or otherwise coating the faces of the parts with a low-temperature fusible metal and then heat-treating to sweat the parts into soldered connection with one another.

Figure 16:
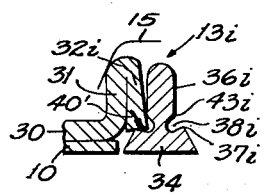
Fig. 16 is a fragmentary sectional view of another modified form of the invention.

The invention as disclosed in Fig. 16

Fig. 16 discloses an arrangement wherein the seal ring 13i is of relatively hard metal and the flanges 32i are of relatively soft metal, or softened by annealing at their inner margins, which in this case provide the seats into which knife edged sealing edges 37i of seal ring 13i are embedded as the inner margins are shrunk in diameter under the combined flexing-tilting action of terminal flanges 32i during compression. In this form of the invention sealing is established between the marginal portion shoulders 37i of the seal ring and the inner marginal walls of the terminal flanges, and there is a fulcruming engagement of the faces of terminal flanges 32i against shoulders 43i which constitute rounded junctions between relief grooves 38i and lateral faces 36i of the seal ring.

Some improvement in operation of this form of the invention may be obtained by slanting the frusto-conical inner marginal walls of terminal flanges 32i in a direction opposite to the slant of the corresponding inner walls in the other forms of the invention, the slope in the present instance being radially outwardly and toward the seal ring 13i as illustrated. Thus, as the inner portions of terminal flanges 32i are contracted as indicated by arrow 40', the direction of contraction is substantially normal to their marginal walls, so as to promote maximum penetration thereof by sealing edges 37i. Edges 37i may be formed by the intersection of the radially inner walls of grooves 38i and the axial end faces of body portion 34i of the seal ring.

I claim:

1. In a fluid sealing live joint coupling for joining a pair of tube sections: axially opposed flange units each including a pair of intermediate and terminal flange parts and a return bend integrally joining them, with the flange parts of each pair folded back on one another in substantially flat face to face opposition in a substantially radial plane, said intermediate flange parts being joined to respective tube sections, said terminal flange parts having axially opposed generally frusto-conical end faces converging slightly toward the coupling axis and having annular sharp cutting and sealing edges at the intersections of said end faces with their inner marginal walls; seal ring means interposed and engaged between said sealing edges and having seats of metal softer than said terminal flanges, into which said sealing edges are adapted to be forced with fluid sealing seating; said seats comprising substantially radial faces and said sealing edges being of greater diameter than the minimum diameter of said radial faces when unstressed; and means engaging peripheral areas of said intermediate flange parts under axial compression with said terminal flange parts being of such substantial radial dimension between said peripheral areas and the areas of said seating of said sealing edges, and deflected toward one another, with a Belleville washer type deflection, to such an extent that said sealing edges, under the effect of extended usage, may advance into deeper penetration of said seats without substantially lessening the pressure exerted by said sealing edges against said seats.

2. A coupling as defined in claim 1, wherein the flange parts of each of said pairs are in face to face contact with one another in an annular area extending from said return bends inwardly at least a substantial portion of the radius of said flange parts.

3. A coupling as defined in claim 1, wherein the flange parts of each said pairs are in face to face contact with one another throughout substantially the entire area of the respective terminal flange parts.

4. A coupling as defined in claim 1, wherein said seal means comprises a seal ring of a single metal of uniform texture throughout its cross-sectional area including at least one of said seats.

5. A coupling as defined in claim 1, wherein said seal ring means comprises a seal ring having a core body of metal and coatings of a metal softer than said core body, adhering to the sides of said core body and constituting at least one of said seats.

6. In a fluid sealing live joint coupling for joining a pair of tube sections: axially opposed flange units each including a pair of intermediate and terminal flange parts and a return bend integrally joining them, with the flange parts of each pair folded back on one another in flat face to face contact in a radial plane, said intermediate flange parts being joined to respective tube sections, said terminal flange parts being of progressively increasing thickness from their peripheries toward the coupling axis, having axially opposed frusto-conical end faces converging slightly toward the coupling axis and having at the intersections of said end faces with their inner marginal walls, annular sharp cutting and sealing edges; a seal ring interposed and engaged between said sealing edges and having on its opposite sides axially facing seats of metal softer than said sealing edges, into which said sealing edges are adapted to be forced with fluid-sealing seating; said seats comprising substantially radial faces and said sealing edges when unstressed being of greater diameter than the minimum diameter of said radial faces; and means engaging the axially remote sides of said intermediate flange parts adjacent the peripheries thereof under axial compression and remaining out of contact with said peripheries and out of contact with the areas of said sides inwardly of the peripheral areas thereof, whereby the peripheral areas of said intermediate and terminal flange parts are deflected by said compression toward the median plane of said seal ring, with said intermediate flange parts flexing toward obtuse angular relation to the respective tube sections and said terminal flange parts undergoing a Belleville washer type flattening deflection with said sealing edges fulcruming on said seats, the radial distance between the areas of compressive engagement and said sealing edges being a materially greater dimension than the combined thickness of a pair of terminal and intermediate flange parts, whereby the combined axial deflections of said flange parts are of such extent that said sealing edges, under the effect of extended usage, may advance into deeper penetration of said seats without substantially lessening the pressure exerted by said sealing edges against said seats.

7. A coupling as defined in claim 6, wherein said seal ring is of T-section, including a tubular body and an annular rib projecting radially outwardly from the central area thereof and having said seats in its respective opposite faces, said body comprising respective annular parts projecting axially, indexed within said inner marginal walls, and accommodated in spaces subtended between said inner marginal walls and the inner surfaces of radius bends outwardly of the inner diameter of said tube sections at the junctures of said tube sections and said intermediate flange parts.

8. In a fluid sealing live joint coupling for joining a pair of tube sections: axially opposed flange units each including a collar for attachment to a respective tube section, an outwardly flared base bend, an intermediate flange part projecting generally radially outwardly from said base bend, a return bend at the periphery of said intermediate flange part, and a terminal flange part extending generally radially inwardly from said return bend, each terminal flange part being in substantially flat face to face opposition to the respective intermediate flange part in a substantially radial plane, said collar, return bend and flange parts being integrally united; said terminal flange parts having axially opposed frusto-conical end faces converging slightly toward the coupling axis, having inner marginal walls disposed near the areas where said base bends join said intermediate flanges, and having sharp cutting and sealing edges at the intersections of said end faces and inner marginal walls; a seal ring interposed between said sealing edges and having on its opposite sides axially facing seats of metal softer than said sealing edges, into which the latter are adapted to penetrate with fluid-sealing seating, said seats comprising substantially radial faces and said sealing edges when unstressed being of greater diameter than the minimum diameter of said radial faces; and means engaging the axially remote sides of said intermediate flange parts adjacent the peripheries thereof under axial compression and remaining out of contact with said peripheries and out of contact with the areas of said sides inwardly of the peripheral areas thereof, whereby the peripheral areas of said intermediate and terminal flange parts are deflected by said compression toward the median plane of said seal ring, with said intermediate flanges flexing at said base bends toward obtuse angular relation to the respective tube sections and said terminal flange parts undergoing a Belleville washer type flattening deflection with said sealing edges fulcruming on said seats, the radial distance between the areas of compressive engagement and said sealing edges being a materially greater dimension than the combined thickness of a pair of terminal and intermediate flange parts, whereby the combined axial deflections of said flange parts are of such extent that said sealing edges, under the effect of extended usage, may advance into deeper penetration of said seats without substantially lessening the pressure exerted by said sealing edges against said seats.

9. A coupling as defined in claim 8, wherein said seal ring is of T-section, including a tubular body and an annular rib projecting radially outwardly from the central area thereof and having said seats in its respective opposite faces, said body comprising respective annular parts projecting axially, indexed within said inner marginal walls, and accommodated in spaces subtended between said inner marginal walls and the inner surfaces of said base bends, outwardly of the inner diameter of said collars.

10. A coupling as defined in claim 9, wherein said tubular body portion of the seal ring has, at the respective sides of said rib, frusto-conical faces diverging toward the coupling axis, said base bends having inner walls likewise diverging toward the coupling axis, to which said frusto-conical faces are roughly fitted.

11. In a fluid sealing live joint coupling for joining a pair of tube sections: axially opposed flange units each including a collar for attachment to a respective tube section, an outwardly flared base bend, an intermediate flange part projecting generally radially outwardly from said base bend, a return bend at the periphery of said intermediate flange part, and a terminal flange part extending generally radially inwardly from said return bend, each terminal flange part being in substantially flat face to face opposition to the respective intermediate flange part in a substantially radial plane, said collar, bend and flange parts being integrally united; said terminal flange parts having axially opposed frusto-conical end faces converging slightly toward the coupling axis, having inner marginal walls disposed near the areas where said base bends join said intermediate flanges, and having sealing edges at the intersections of said end faces and inner marginal walls; an annular seal of T-section including a tubular body portion and an annular rib projecting radially outwardly from the central area thereof and having, as its respective sides seats of metal softer than said sealing edges, against which said sealing edges are adapted to be forced with fluid sealing seating, said seats comprising substantially radial faces and said sealing edges when unstressed being of greater diameter than the minimum diameter of said radial faces; said body portion comprising respective annular parts projecting axially, indexed within said inner marginal walls, and accommodated in spaces subtended between said inner marginal walls and the inner surfaces of said base bends, outwardly of the inner diameter of said collars; and means engaging axially remote sides of said intermediate flange parts and applying thereto compressive forces restricted to annular areas of said sides adjacent the peripheries thereof, whereby the peripheral areas of said intermediate and terminal flange parts are deflected by said compression toward the median plane of said seal ring, with said intermediate flange parts flexing at said base bends toward obtuse angular relation to the respective tube sections and said terminal flange parts undergoing a Belleville washer type flattening deflection with said sealing edges fulcruming on said seats, the radial distance between the areas of compressive engagement and said sealing edges being a materially greater dimension than the combined thickness of a pair of terminal and intermediate flange parts, whereby the combined axial deflections of said flange parts are of such extent that said sealing edges and seats, under the effect of extended usage, may advance toward one another with a progressive indenting effect without substantially lessening the pressure exerted by said sealing edges against said seats.

12. A coupling as defined in claim 11, wherein said tubular body portion of the seal ring has, at the respective sides of said rib, annular grooves projecting radially inwardly in said annular body parts, said seal ring seats being extended into said grooves.

13. A coupling as defined in claim 12, wherein said inner marginal walls of the terminal flange parts are of a diameter only slightly larger than the diameter of said projecting annular body parts outwardly of said grooves, so as to be contracted by said Belleville washer type flattening, into substantially seating engagement with said body portion parts for indexing the seal ring and the flange units in concentric relation.

14. In a live joint fluid line coupling for joining a pair of tube sections: a pair of axially spaced seal rings each having substantially radial soft metal seats on axially opposite faces thereof; a central flange unit including a tubular web portion and frusto-conical terminal flanges extending, in diverging relation toward the axis of the coupling at the respective ends of said web portion; outer flange units on the ends of the respective tube sections, each of said outer flange units including an intermediate flange part integrally joined to and extending substantially radially outwardly from a respective tube section, an integral return bend at the periphery of said intermediate flange part, and a terminal flange part integral with and projecting substantially radially inwardly from said return bend, folded back upon the respective intermediate flange in substantially flat face-to-face opposition thereto, and having a generally frusto-conical end face in slightly inwardly converging axial opposition to a respective terminal flange of said central flange unit; said terminal flanges and terminal flange parts having annular sharp sealing edges at the intersections of their respective frusto-conical faces with their inner margins, said sealing edges being of greater diameter than the minimum diameter of said seats when unstressed and adapted to be forced into the respective seats of said sealing rings with fluid sealing seating; and means engaging peripheral areas of said intermediate flange parts under axial compression with said terminal flange parts and said terminal flanges being of such substantial radial dimension between said peripheral areas and the areas of said seating of said sealing edges, and deflected toward one another with a Belleville washer type deflection, to such an extent that said sealing edges, under the effect of extended usage, may advance into deeper penetration of said seat without substantially lessening the pressure exerted by said sealing edges against said seat.

15. A coupling as defined in claim 14, wherein said central flange unit is provided therein with means to support a device for acting upon the fluid flowing in said line.

16. In a live joint fluid line coupling for joining a pair of tube sections: a pair of axially spaced seal rings each having substantially radial soft metal seats on axially opposite faces thereof; a central flange unit including a tubular web portion and frusto-conical terminal flanges extending, in diverging relation toward the axis of the coupling at the respective ends of said web portion; outer flange units on the ends of the respective tube sections, each of said outer flange units including an intermediate flange part integrally joined to and extending substantially radially outwardly from a respective tube section, an integral return bend at the periphery of said intermediate flange part, and a terminal flange part integral with and projecting substantially radially inwardly from said return bend, folded back upon the respective intermediate flange in substantially flat face-to-face opposition thereto, and having a generally frusto-conical end face in slightly inwardly converging axial opposition to a respective terminal flange of said central flange unit; said terminal flanges and terminal flange parts having annular sealing edges at the intersections of their respective frusto-conical faces with their inner margins, said sealing edges being of greater diameter than the minimum diameter of said seats when unstressed and adapted to be forced against the respective seats of said sealing ring with fluid sealing seating; and means engaging axially remote sides of said intermediate flange parts and applying thereto compressive forces restricted to annular areas of said sides adjacent the peripheries thereof, whereby the peripheral areas of said intermediate and terminal flanges and flange parts are deflected by said compression toward the median plane of said seal ring, with said intermediate flange parts flexing toward obtuse angular relation to the respective tube sections and said terminal flanges and flange parts undergoing a Belleville washer type flattening deflection with said sealing edges fulcruming on said seats, the radial distance between the areas of compressive engagement and said sealing edges being of such extent, and the combined axial deflections of said flange parts being such that said sealing edges and seats, under the effect of extended usage, may advance toward one another with a progressive indenting effect without substantially lessening the pressure exerted by said sealing edges against said seats.

17. A coupling as defined in claim 16, wherein said terminal flange parts are folded in a flat face to face contact with said intermediate flange parts, and are of progressively increasing thickness from the peripheries thereof toward their inner margins.

18. In a fluid sealing live joint coupling for joining a pair of tube sections: axially opposed flange units each including a collar for attachment to a respective tube section, an outwardly flared base bend, a flange part projecting generally radially outwardly therefrom, and a terminal part integral with said flange part, said base bends and flange parts being flexible; said terminal parts having axially opposed generally frusto-conical end faces converging slightly toward the coupling axis, having inner marginal walls disposed near the areas where said base bends joint said intermediate flanges, and having annular sharp cutting and sealing edges at the intersections of said end faces and said inner marginal walls; seal ring means interposed and engaged between said sealing edges and having on its opposite sides axially facing seats of metal softer than said sealing edges, into which said sealing edges are adapted to be forced with fluid-sealing seating; said seats comprising substantially radial faces and said sealing edges when unstressed being of greater diameter than the minimum diameter of said radial faces; and means engaging the axially remote sides of said flange parts under axial compression, the portions of said flange parts outwardly of said sealing edges and inwardly of said peripheral areas of compressive engagement being of substantial radial dimension such as to be deflected axially toward one another in response to said compressive engagement, whereby said sealing edges, under the effect of extended usage, may advance into deeper penetration of said seats without substantially lessening the pressure of their contact against said seats.

19. In a fluid sealing live joint coupling for joining a pair of tube sections: axially opposed flange units each including a collar for attachment to a respective tube section, an outwardly flared base bend, a flange part projecting generally radially outwardly therefrom, and a terminal part integral with said flange part, said base bends and flange parts being flexible; said terminal parts having, as their end extremities, axially opposed annular concentric integral sharp cutting and sealing edges located at a radius intermediate the radii of their outer peripheries and of said collars; a seal ring interposed and engaged between said sealing edges and having on its opposite sides axially facing seats of metal softer than said sealing edges, into which said sealing edges are adapted to be forced with fluid sealing seating; said seats comprising substantially radial faces and said sealing edges when unstressed being of greater diameter than the minimum diameter of said radial faces; and means engaging axially remote sides of said intermediate flange parts and applying thereto compressive forces restricted to annular areas of said sides adjacent the peripheries thereof, whereby, with said sealing edges fulcruming against said seats, said base bends will be flexed toward more obtuse angular relation to the respective collars and said flange parts, outwardly of said sealing edges, will be deflected axially toward one another; the radial distance between the areas of compressive engagement and said sealing edges being substantial, such that the amount of said deflection of said flange parts outwardly of said sealing edges will be adequate to compensate for thermal expansions and contractions in the tubing line and for axial misalignment of the respective tube sections while maintaining sealing pressure of said sealing edges against said seats distributed with full fluid sealing effectiveness around a full circumference, and providing for continued axial advance of the sealing edges in response to any deepening indentation of the seats that may occur as the result of extended usage, without substantially lessening the pressure of sealing contact of the sealing edges against the seats.

20. A coupling as defined in claim 19, wherein said radial distance between the sealing edges and the areas of compressive engagement is slightly greater than the radial distance between the sealing edges and the collar radius.

21. In a live joint fluid sealing coupling for joining a pair of tube sections: a seal ring of T-section including a tubular body and an annular rib projecting radially outwardly therefrom and having substantially radial faces, the respective end portions of said tubular body projecting axially in opposite directions from said rib and having substantially cylindrical peripheral shoulders providing seal seats; a pair of flange units each including an intermediate flange part integrally joined at its base to a respective tube section and projecting radially outwardly therefrom and a terminal flange part projecting from the periphery of the respective intermediate flange part toward the coupling axis in a generally radial direction but inclined slightly toward the respective faces of said seal ring rib, said terminal flange parts having end faces fulcrumed against said rib faces with circular lines of contact disposed radially outwardly of said seats and having inner marginal sealing lips projecting inwardly from said circular lines of fulcruming contact and terminating in sharp sealing edges of metal harder than said seats directed radially inwardly for maximum concentration of radial sealing pressure against said seats and in sealing contact therewith; and means engaging the axially remote sides of said intermediate flange parts adjacent the peripheries thereof under axial compression and remaining out of contact with said peripheries and out of contact with the areas of said sides inwardly of the peripheral areas thereof, whereby the peripheral portions of said intermediate and terminal flange parts are deflected by said compression toward the median plane of said seal ring, with said intermediate flange parts flexing at their base areas and inclining toward obtuse angular relation to the respective tube sections, and said terminal flanges undergoing a Belleville washer type flattening deflection whereby said sealing edges are contracted into tight fluid sealing engagement with said seats.

22. A coupling as defined in claim 21, wherein said seal ring is provided with a pair of annular grooves projecting axially into the radial faces of said ribs immediately outwardly of the diameter of said seats, wherein said seats are continued into said grooves and wherein said rib is provided at the outer margins of said grooves, with fulcrum shoulders against which the end faces of said terminal flange parts bear, with said annular grooves providing axial clearance for said sealing edges inwardly of said shoulders.

23. A coupling as defined in claim 22, wherein said flange units include return bends integrally joining said intermediate flange parts to the respective terminal flange parts, the latter being folded back upon the intermediate flange parts in substantially face to face opposition in a substantially radial plane.

24. A coupling as defined in claim 21, wherein said terminal flange parts are in the form of individual washers separate from said intermediate flange parts and wherein said intermediate flange parts are provided with rim portions folded back around the peripheral portions of said washers and sealed thereto, said peripheral portions being flatly clamped against the inner faces of said intermediate flanges and the inner portions of said washers being inclined inwardly toward the median plane of said seal ring.

25. A coupling as defined in claim 21, wherein said terminal flange parts have bevelled inner marginal faces which are inclined away from the radial faces of said seal ring rib and toward the axis of the coupling, said bevelled marginal faces merging with the end faces of said terminal flange parts to define fulcruming shoulders bearing against the radial faces of said rib and said marginal faces intersecting the opposite faces of said terminal flange parts to define said sealing edges as the inner extremities of said terminal flange parts, with said sealing edges spaced axially away from the planes of the respective radial faces of said seal ring.

26. In a live joint fluid sealing coupling for joining a pair of tube sections: a seal ring of T-section including a tubular body and an annular rib projecting radially outwardly therefrom and having substantially radial faces, the respective end portions of said tubular body projecting axially in opposite directions from said rib and having peripheral shoulder elements; a pair of flange units each including an intermediate flange part integrally joined at its base to a respective tube section and projecting radially outwardly therefrom, a terminal flange part projecting from the periphery of the respective intermediate flange part toward the coupling axis in generally radial direction but inclined slightly toward the respective faces of said seal ring rib, and a return bend integrally joining said terminal flange part to said intermediate flange part, said terminal flange parts having end faces fulcrumed against said rib faces with circular lines of contact disposed radially outwardly of said shoulder elements and having inner marginal elements in sealing engagement with said peripheral shoulder elements, one of the elements of each pair being a sharp sealing edge directed radially for maximum concentration of radial sealing pressure against the other of said pair of elements, said other element of each pair being a seat of metal softer than said sealing edge; and means engaging the axially remote sides of said intermediate flange parts adjacent the peripheries thereof under axial compression and remaining out of contact with said peripheries and out of contact with the areas of said sides inwardly of the peripheral areas thereof, whereby the peripheral portions of said intermediate and terminal flange parts are deflected by said compression toward the median plane of said seal ring, with said intermediate flange parts flexing at their base areas and inclining toward obtuse angular relation to the respective tube sections, and said terminal flange parts undergoing a Belleville washer type flattening deflection whereby said inner marginal elements are contracted into tight fluid sealing engagement with said peripheral shoulder elements.

27. A coupling as defined in claim 26, wherein said sharp sealing edges constitute the radially outward extremities of said peripheral shoulder elements and wherein said seats constitute the inner margins of said terminal flange part.

28. A coupling as defined in claim 27, wherein said seal ring has a pair of annular grooves projecting axially into the annular rib thereof adjacent said peripheral shoulder element, said rib having as the radially outward extremities of said annular grooves, fulcrum shoulders against which the end faces of said terminal flange parts are in fulcruming engagement.

References Cited in the file of this patent

UNITED STATES PATENTS

| | | |
|---|---|---|
| 682,026 | Bungeroth | Sept. 3, 1901 |
| 854,869 | Brinkman | May 28, 1907 |
| 1,819,036 | Oberhuber | Aug. 18, 1931 |

FOREIGN PATENTS

| | | |
|---|---|---|
| 488,609 | France | July 6, 1918 |